United States Patent [19]

Hemingway

[11] Patent Number: 5,986,661
[45] Date of Patent: Nov. 16, 1999

[54] GRAPHICS OUTPUT SYSTEM WITH BOUNDED UPDATING

[75] Inventor: Peter Hemingway, Bristol, United Kingdom

[73] Assignee: Hewlett-Packard Company, Palo Alto, Calif.

[21] Appl. No.: 08/636,214

[22] Filed: Apr. 22, 1996

Related U.S. Application Data

[63] Continuation of application No. 08/211,498, filed as application No. PCT/GB91/01767, Oct. 10, 1991.

[51] Int. Cl.⁶ .................................................. G06T 15/10
[52] U.S. Cl. ............................................................ 345/421
[58] Field of Search .................................... 395/120–121; 345/420–421

[56] References Cited

U.S. PATENT DOCUMENTS

| | | | |
|---|---|---|---|
| 4,811,245 | 3/1989 | Bunker et al. | 345/429 |
| 4,862,392 | 8/1989 | Steiner | 345/427 |
| 4,928,250 | 5/1990 | Greenberg et al. | 345/426 |
| 4,967,375 | 10/1990 | Pelham et al. | 345/515 |
| 5,058,042 | 10/1991 | Hanna et al. | 345/427 |
| 5,115,402 | 5/1992 | Matsushiro et al. | 345/441 |
| 5,185,599 | 2/1993 | Doornink et al. | 345/516 |

OTHER PUBLICATIONS

Foley et al.; Computer Graphics: Principles and Practice; 2$^{nd}$ Edition; 1990; pp. 37, 55, 58–63, 71–72, 96–99; 124–125, 660–661, 664–665, 668–669, 680–689, 897–898,943–944, 705–706.

Gordon et al.; Front–To–Back Display of BSP Trees; Sep. 1991; pp. 79–85.

A. Goris et al., "A Configurable Pixel Cache for Fast Image Generation," *I.E.E.E. Computer Graphics & Applications,* 7 (1987) Mar., No. 3, New York, NY, USA, pp. 24–32.

Salmon, Rod and Slater, Mel, "Computer Graphics Systems and Concepts", Addison–Wesley:Wokingham, England, 1987, pp. 228–238.

Computer Vision Graphics and Image Processing, vol. 29, No. 3, Mar. 1985, New York, U.S., pp. 361–376, Gordon, "Image Space Shading of 3–D Objects".

Eurographics '89, Sep. 4, 1989, Amsterdam, pp. 51–61, Qun–Sheng Peng and You–Dong Liang, "Accelarated Radiosity Method for Complex Environments".

Newman et al., *Principles of Interactive Computer Graphics,* second edition, McGraw–Hill, pp. 229–273.

Hemingway, doctoral thesis, *Computer Display Architecture,* Cambridge University Library, England, class mark PHD 150 76.

*Primary Examiner*—Anton Fetting

[57] ABSTRACT

A graphics output system stores a collection of graphic segments that are intended for display, potentially in overlapping relation, in a two-dimensional output image. The stored graphic segments are converted into a representation of an output image. The stored graphic segments are specified by boundary inter-relationship data respectively determining the boundary of each segment and the relative depth priorities of the segments in the output image and any clipping of each said segment to the boundary of a lower-priority segment that it can potentially overwrite. The collection of graphic segments is modified, for example, by deleting or adding segments. A new image representation is not formed from the beginning each time the segment collection is modified. Instead, the output image representation is within a region delimited by the boundary of one or more segments associated with the modification. Preferably, this bounded updating is facilitated by maintaining association data identifying the segment corresponding to each image position.

15 Claims, 9 Drawing Sheets

GRAPHICS OUTPUT SYSTEM WITH BOUNDED UPDATING

This application is a continuation of application Ser. No. 08/211,498 filed Apr. 7, 1994.

TECHNICAL FIELD

The present invention relates to graphics output systems in which bounded updating of the output image can be effected, that is, the area of the image subject to updating can be restricted.

BACKGROUND ART

It is well known to build up an internal representation of a two-dimensional image to be displayed, in terms of discrete graphic segments that potentially overlap in the image. Where these graphic segments are to be displayed as solid bodies, then it is necessary to determine which segment has priority in the event of overlap between two segments. This depth priority issue is generally handled by assigning differing priorities to the various segments (either explicitly, or implicity through an hierarchical organization of the segments) and then resolving any overlap conflicts according to the assigned priorities of the segments concerned. The actual resolution process is effected as part of the overall process of converting the graphic segments into an output image.

A general discussion of image construction from multiple segments and of the priority resolution issue, can be found in most standard textbooks on graphics systems such as "Principles of Interactive Computer Graphics" William M. Newman and Robert F Sproull, second edition. McGraw-Hill.

When it is desired to update the output image, the previously existing collection of graphic segments is modified for example by the deletion or addition of one or more segments or by the alteration of the defining parameters of one or more segments. segments. The process of converting the segments into a new output image can then be carried out anew for the modified segment collection.

Reconstructing all of the output image is generally inefficient where only a small part of the image is effected by the modification of the segment collection. Accordingly, it is known to store an image representation and then restrict updating to a portion only of that representation, this portion being sufficient to encompass the affected area of the image. In one known system, the output image is nationally divided into an array of rectangular tiles delimiting update zones; whenever the underlying segment collection is modified, updating of the image representation is then restricted to a reconversion of the update zones that are affected by the modification. In another known system, updating of the image representation is restricted to a rectangular bounding box enclosing the affected image area. Both the foregoing approaches thus rely on artificial boundaries to delimit the update zone.

It is an object of the present invention to provide a graphics output system in which updating is bounded in a more natural manner.

SUMMARY OF THE INVENTION

According to one aspect of the present invention, there is provided a graphics output system comprising:

segment storage means for storing a collection of graphic segments that are intended for display, potentially in overlapping relation, in a two-dimensional output image, said graphic segments being specified by data including boundary data determining the boundary of each segment, and inter-relationship data determining the relative depth priorities of the segments in the output image and any clipping of each said segment to the boundary of a lower-priority segment that it can potentially overwrite (herein the "background" segment of the segment concerned), means for modifying said collection of graphic segments, and converter means for rendering the stored graphic segments as an image representation representative of said two-dimensional image with all interactions between segments taken into account, the converter means being operative to store said image representation, and said converter means being responsive to modification of said collection of graphic segments, to update its said image representation within a region that is delimited by the boundary of one or more segments associated with said modification.

The update region is thus delimited by the natural boundaries provided by the graphic segments.

The aforesaid image representation may take the form of a frame buffer mapping each image pixel; however, preferably the image representation is a compressed image representation constituted by a span table listing for each of a plurality of image lines, the succession of spans making up that line.

In one embodiment, the converter means, in response to the modification of said collection of graphic segments by the addition of a new segment thereto, is operative to update the image representation by rendering the following segments from the modified collection:

segments of higher depth priority than said new segment, any background segment of said new segment, and said new segment itself, these newly-rendered segments then being written to said image representation but only within the boundary of said new segment.

Similarly, the converter means, in response to the modification of said collection of graphic segments by the deletion of an existing segment therefrom, can be arranged to update said image representation by rendering all the segments from the modified collection but only writing them to said image representation within the boundary of the deleted segment.

In both the foregoing cases, the converter means advantageously limits overwriting of the image representation to within the boundary of the new/deleted segment by initially marking the region of said image representation corresponding to said new/deleted segment as a root region overwritable by all segments, and thereafter writing the segments rendered from said modified collection into said image representation with each segment only overwriting said root region or a lower-priority segment.

Preferably, the converter means makes use of a prior knowledge of the composition of the current image to facilitate bounded updating. To this end, the converter means maintains association data indicative of the segment appearing at each position within said image (for example, where the image representation is a span table then the association data can be provided by appending the identity of the associated segment to each span).

With such association data available, the converter means, in response to the modification of said collection of graphic segments by the addition of a new segment thereto, may now operate to update the image representation by determining, from said association data, whether the said new segment interacts solely with a background segment thereof; if so, the converter means proceeds to render the new segment and overwrite the existing image representation with the newly-rendered segment. If the new segment's interaction is not solely with its background segment, then the converter means can be arranged to update the image representation by rendering the new segment and overwriting the existing image representation with the newly-rendered segment in positions where either the existing segment is the background segment to the new segment, or the existing segment is of lower depth priority than the new segment and either has the same background segment as said new segment or is directly or indirectly written on a segment having said same background segment (the inter-relationships between segments can be ascertained by reference to the aforesaid inter-relationship data).

Similarly, where association data is available, the converter means, in response to the modification of said collection of graphic segments by the deletion of an existing segment therefrom, may now operate to update said image representation by determining whether the deleted segment interacts solely with a background segment thereof in said image and, if so, to re-render only said background segment and overwrite the existing said image representation with said newly-rendered background segment where, according to said association data, the deleted segment appeared in said image representation. Preferably, in order to facilitate the aforesaid determination, each segment is flagged to indicate whether it interacts solely with its background segment, the segment flags being updated by the converter means whenever it updates the image. If the interaction of the segment being deleted is not solely with its background, then the converter means can be arranged to update the image representation by re-rendering the background segment and any segments that are of lower depth priority than said deleted segment, the newly-rendered segments being written into the existing said image representation only where, according to said association data, said deleted segment appeared in said image representation.

In another embodiment of the graphics output system, the converter means is operative to maintain association data indicative of both the top-level segment appearing at each position within said image and any next-level segment underlying said top-level segment for each said position. In this case, the converter means, in response to the modification of said collection of graphic segments by the deletion of an existing segment therefrom, is operative for each occurrence of said deleted segment in said image representation as a top-level segment, to replace that occurrence by upgrading the corresponding next-level segment to a said top-level segment.

Where a segment is added or deleted together with dependent, or child, segments, these latter segments can each be processed separately in turn as newly added or deleted segments. Preferably, however, the child segments are processed by said converter means along with their parent with the update boundary being extended to encompass the children.

Where modification of said collection of segments involves modifying an existing segment in a manner affecting the extent of appearance of other segments in said image, then this modification is advantageously treated by the converter means as the deletion of said existing segment in its unmodified form and addition of a new segment corresponding to said existing segment in its form after modification.

BRIEF DESCRIPTION OF THE DRAWINGS

A graphics output system embodying the present invention, will now be described, by way of non-limiting example, with reference to the accompanying diagrammatic drawings, in which.

BEST MODE OF CARRYING OUT THE INVENTION

Figure 1:
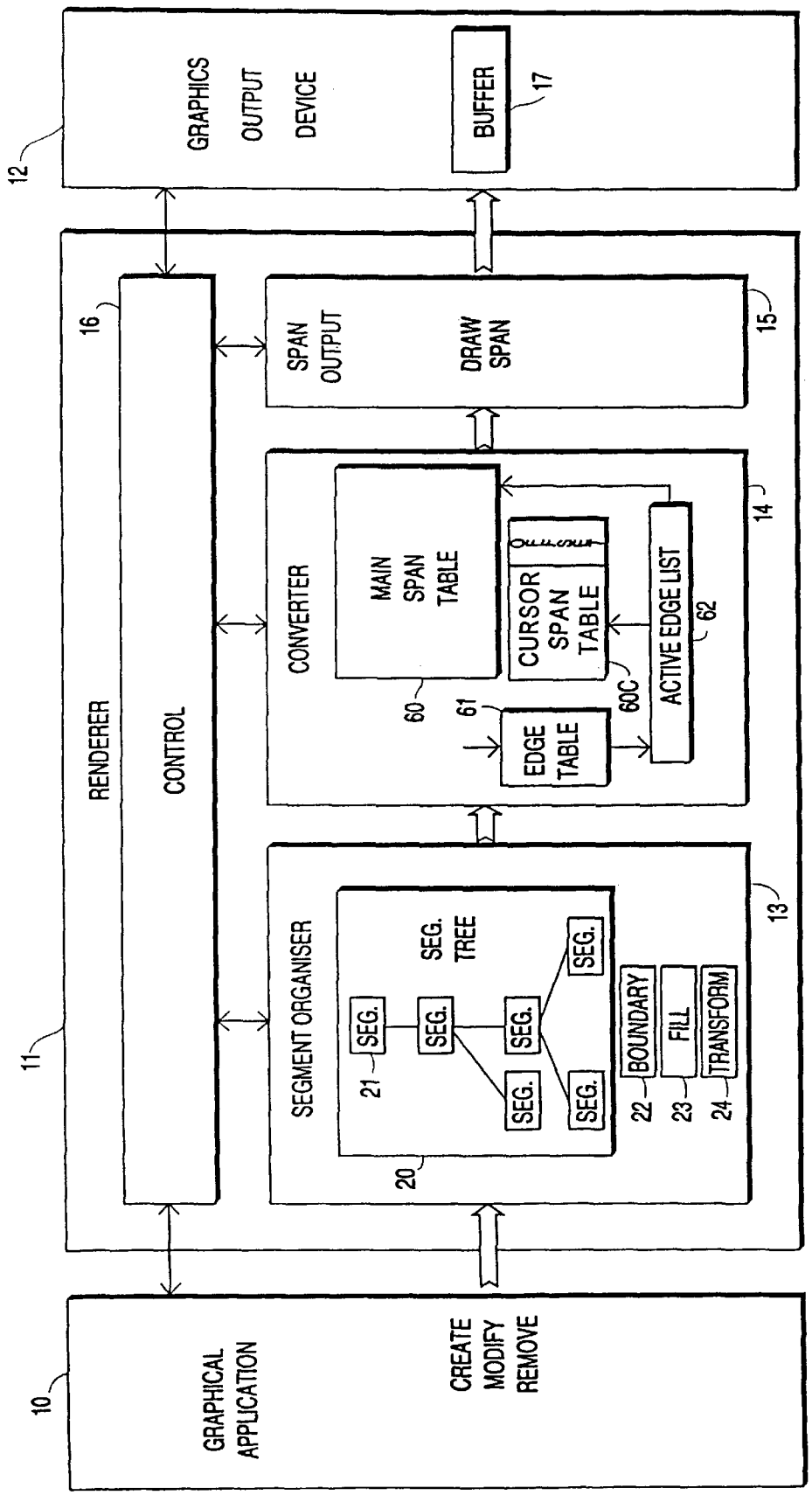
FIG. 1 is a functional block diagram of the graphics output system showing a renderer that serves both to organize graphic segments to be presented as a two-dimensional image, and to convert these segments into a series of spans held in a span table for output to a graphics output device.

The graphics output system shown in functional block diagram form in FIG. 1 basically comprises a renderer 11 operative to interface a graphical application 10 to a graphics output device 12 such as a video display unit or printer.

The graphical application 10 instructs the renderer 11 to build up an output image, this instruction being in the form of commands to create, modify or remove graphic segments 21. These graphics segments, which are the only graphic elements used to construct the output image, are created and stored in a segment organizer 13 of the renderer 11. The organizer 13 organizes the segments 21 into a segment tree 20 which, as will be more fully described hereinafter, determines the inter-relationship of the segments in the final image. The graphic segments 21 are such that they potentially overlap each other in the final image so that depth priority resolution is necessary.

Each graphic segment 21 is defined in terms of its boundary, fill and transform. These parameters are described more fully below and for the present it is sufficient to note that the parameters of boundary, fill and transform will generally be stored by the organizer 13 in respective data structures 22, 23 and 24 which are referenced by the segments 21 as required.

Once the graphical application 10 has finished instructing the renderer 11 to build up the desired output image in terms of the segment tree 20, this segment tree is converted by a converter 14 of the renderer 11 into a form suitable for output to the graphics output device 12. More particularly, the segment tree is converted into a span table 60 in which the image is represented as a succession of lines made up of one or more spans. As will be described hereinafter, in constructing the span table 60 the converter 14 first forms an edge table data structure 61 and then builds up each line of the output image using an active edge list data structure 62. The conversion process resolves any overlap conflicts between the segments in terms of their inter-relationships and depth priorities.

The image information contained in the span table 60 is then output to the graphics output device 12 by a span output process 15. This process may either output span information line by line as each line is completed or else wait until the span table is finished and then pass the span information to the device 12. The actual passing of span information is effected a single primitive "Drawspan" that simply instructs the output device 12 to draw a span of specified length.

The graphics output device 12 will generally buffer information received from the renderer 11 in a buffer 17 before displaying/printing the final output image. In many cases, the buffer 17 will be a frame buffer holding a full image representation.

The overall operation of the renderer 11 is controlled by a control unit 16, the primary function of which is to sequence the operation of the various elements. In particular, the control unit 16 ensures that the converter 14 does not start its conversion process until the graphical application 10 has finished instructing the segment organizer 13 regarding the construction of the segment tree 20. Furthermore, the control unit 16 ensures that the span output process 15 is coordinated with the build up of the span table 60. It will be appreciated that although the control unit 16 has been shown as a distinct functional entity, in practice its functionality may well be embedded within the other functional elements; thus, for example, the segment organizer 13 may implement an interlock arrangement to ensure that the graphical application 10 and the converter 14 cannot simultaneously access the segment tree 20.

From the foregoing overview of the renderer 11, it can be seen that it provides a conceptually simple interface between the graphical application 10 and the graphics output device 12 since, on the one hand, its interface with the graphical application 10 is defined in terms of a single graphics element (namely the graphics segment 21) whilst, on the other hand, its interface with the graphics output device 12 is defined in terms of a single operational primitive (Drawspan). This latter feature ensures that the renderer 11 can be ported between the different output devices without difficulty.

Segments & Segment Organizer

The attributes and possible inter-relationships of a graphic segment 21 will now be described with reference to the segment 21A in FIG. 2 (it should be noted that in the present description the term "graphic segment" is applied to all representations of a segment—in the case of FIG. 2, the segment 21A is represented in terms of a data structure including fields 28 to 38 that define the parameters or attributes of the segment).

The first field associated with the segment 21A is a segment identity field 28 uniquely identifying the segment. The remaining defining fields are divided into two groups, namely a first group of fields 29,30,31,33 that are directly concerned with how the segment appears in the final image, and a second group of fields 34 to 38 that define the inter-relationship of the segment 21A with other segments in the segment tree 20 (these inter-relationships do, of course, also affect how the segment is displayed in the final image but this effect is less personal than that of the fields 29,30, 31,33).

Field 29 defines the boundary of the segment in terms of one or more outlines specified by their defining points (i.e. vertices) where a point is an X-Y co-ordinate pair in an X,Y co-ordinate space in which the basic unit of distance in each co-ordinate direction is a "point-unit" (this is a conceptual unit that is used between the graphical application 10 and the renderer 11 and which is translated into real-world image dimensions in a manner to be described hereinafter). In fact, the segment data structure will generally not contain the full specification of the boundary but merely hold in field 29 a pointer to a boundary data structure 22 that contains the set or sets of defining points; this arrangement enables segments to share a common boundary definition. The segment boundary is considered to have zero width. The boundary of a segment can be of any shape, regular or irregular.

Within its boundary, a segment contains a "fill" that can be of one of three forms, namely a solid colour, a half-tone, or a bit map. In the case of a solid colour fill, the relevant colour specification will be held directly in a fill field 30; for other types of fill, the field 30 will hold a pointer to a fill data structure 23 that specifies the nature of the desired fill.

The boundary and fill fields 29, 30 define the basic form and content of the segment 21A. Its position relative to a parent segment is then defined by a Relative Transformation Matrix (RTM) specified in a field 31; again, this specification will generally be in terms of a pointer held in the field 31 and pointing to a transform data structure 24.

The Relative Transformation Matrix (RTM) is a three by three matrix of the form:

Sx Ry 0
Rx Sy 0
Tx Ty 1

The RTM is used to transform a point (and Boundaries because they are composed entirely of points) in one co-ordinate space to the corresponding point defined by the matrix; Sx and Sy apply scaling of the X and Y components. Tx and Ty provide translations for the X and Y components of a point. Rx and Ry are X and Y shear values which, in combination with Sx and Sy are used to provide rotation. The last column of the matrix is provided to allow concatenation of several three by three matrices into a single matrix by simple matrix multiplication.

Field 33 is a visibility field used to flag a segment as one not to be displayed in the current image; this feature is primarily of use for inter-active applications where a segment may only be temporarily obscured in the image and may need to be restored rapidly.

The second group of fields 34 to 38 of the segment 21A define the relationship of the segment 21A with other segments by means of pointers to these other segments. Thus, the field 34 contains a pointer to a segment 21P that constitutes a parent segment for the segment 21A. The field 35 contains a pointer to a sibling segment 21S(1) of the segment 21A (that is, a segment which has both the same parent 21P as the segment 21A). The sibling relationship of the segments 21A and 21S(1) is indicated in FIG. 2 by the arrow 39. The sibling segment 21S(1) may likewise contain a sibling pointer to a further sibling 21S(2). Similarly, the segment 21A may itself be pointed to by another sibling (not shown). In this manner, a sibling chain is established for siblings having the same parent segment 21P. In fact, as will become clear below, separate sibling chains exist for siblings which, while having the same parent, have different relationships with that parent. The ordering of the siblings in a sibling chain determines the relative depth priorities of the siblings.

The segment 21A also contains three pointers in fields 36, 37, and 38, to child segments 21C, each pointer pointing to a different type of child segment. Thus, the field 36 points to child segments 21C that are in an "above attachment" relationship with the segment 21A, this relationship being indicated by arrow 40 in FIG. 2. In fact, the pointer contained in field 36 points to the first child in a sibling chain 25 of all segments 21C associated with the segment 21A by an above-attachment relationship. Similarly, the pointer held in field 37 points to the first child segment 21C in a sibling chain 26 containing all child segments associated with the segment 21A by a "containment" relationship 41. Again, the pointer held in the field 38 points to the first child segment 21C of a below sibling chain 27 of child segments that are associated with the segment 21A by a "below-attachment" relationship 42. The nature of the above-attachment, containment, and below-attachment relationships will be described hereinafter. From the foregoing, it can be seen that the segment 21A has one parent segment; none, one or more sibling segments; and none, one or more children segments arranged in three chains 25, 26 and 27.

Figure 2:
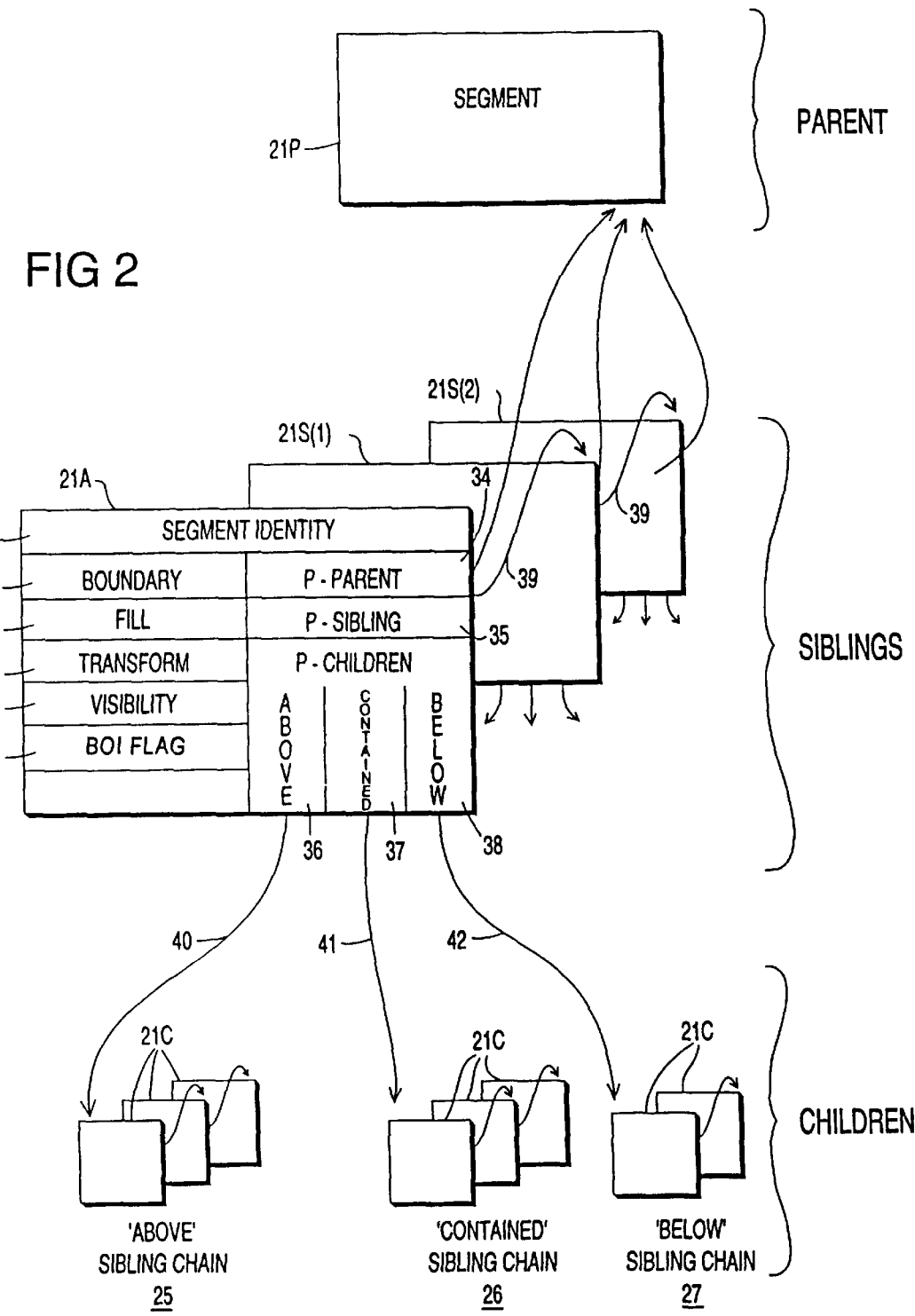
FIG. 2 is a diagram illustrating the data fields associated with a graphic segment and the possible inter-relationships of that segment with other segments.

It will be appreciated that in FIG. 2 only the segment 21A has had its full set of outward relationships described, the other segments illustrated in FIG. 2 having only some of their inter-relationships indicated.

By appropriate setting of the parent, sibling and child pointers held in the fields 34 to 38, it is possible to inter-relate a group of segments into an acyclic tree organization constituting the segment tree 20. The relationships between the segments in the tree serve to fully specify how the various segments affect each other in the final image.

Figure 3:
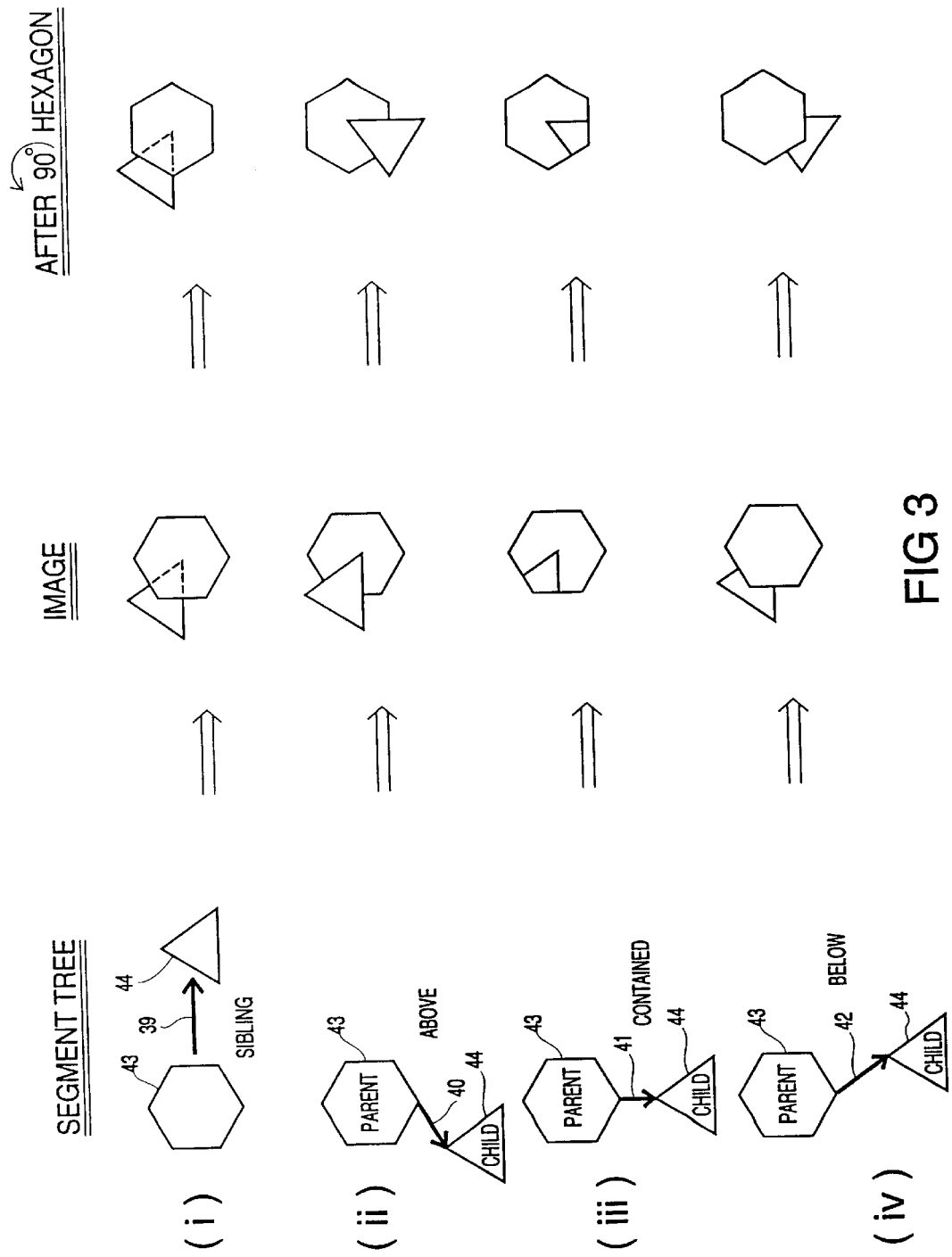
FIG. 3 is a diagram showing the nature of the various inter-segment relationships illustrated in FIG. 2 in terms of the resultant two-dimensional image formed from the segments concerned.

The nature of the "sibling", "contained", "above-attachment" and "below-attachment" relationships will now be described with reference to FIG. 3. In this Figure, a hexagon-shaped segment 43 and a triangular-shaped segment 44 are shown inter-related by each of the foregoing relationships. More particularly, the sibling relationship 39 is depicted in row (i), the above-attachment relationship 40 is shown in row (ii), the containment relationship 41 is shown in row (iii) and the below-containment relationship 42 is shown in row (iv). On the left hand side of each row the segment tree representation of the relationship is depicted. In the middle of each row the appearance of the segments in the output image is shown (for a given transformation of the segment 44 relative to the segment 43). On the right hand side of each row the appearance of the segments in the final image is shown after the hexagon-shaped 43 has been subject to an anti-clockwise rotation through 90°.

It can be seen from row (i) that when a segment 44 is in a sibling relationship to another segment 43, the segment further down the sibling chain has a lower depth priority and so is displayed behind the sibling higher up the sibling chain (in other words, the triangular segment 44 is displayed behind the hexagon segment 43 where these two segments overlap). Row (i) also shows the relative independence of the segments 43, 44 in that the segment 43 can be subject to spatial transformations without affecting the segment 44 (the converse is also true, although not illustrated in FIG. 3).

Row (ii) shows that where the triangular segment 44 is related to the parent segment by an above-attachment relationship, the segment 44 has a higher depth priority than the segment 43 and so appears above the latter where the two segments overlap. Furthermore, the segment 44 is not restricted to the boundary of its parent segment 43. However, the segment 44 is a true child segment of the parent 43 in that it is subject to spatial transformations experienced by its parent 43; thus when the hexagon segment is rotated through 90°, the child segment 44 is similarly rotated and maintains its position relative to the parent segment 43.

The containment relationship illustrated in row (iii) has similarities to the above-attachment relationship in that the child segment 44 overwrites its parent 43 where the two segments overlap. However, this time the child segment 44 is clipped to the boundary of its parent 43 (that is, it does not extend beyond the boundary of its parent). As with all children, the contained child segment 44 is subject to spatial transformations experienced by its parent 43, so that rotation of the latter through 90° also causes the segment 44 to be rotated to maintain its position relative to its parent segment 43.

Row (iv) shows that where a child segment 44 is in a below-attachment relationship to its parent 43, the parent has a higher depth priority where the two segments overlap and will therefore be displayed above the latter in the final output image.

As with the above-attachment relationship, for the below-attachment relationship the child segment 44 is not restricted by the boundary of its parent 43 and can extend beyond the latter boundary. This is in contrast to the containment relationship where the child is, of course, clipped to the boundary of its parent. The below-attachment relationship like the other parent-child relationships results in the child segment 44 being subject to spatial transformations experienced by its parent so that, for example, rotation of the parent segment 43 through 90° results in the child segment being similarly rotated and maintaining its position relative to its parent.

A child segment, as well as having the above-described direct relationship with its parent, also inherits the following from its parent:

(a) spatial transformation inherited by the parent from its parent whereby the final image position, orientation and size of a segment are determined by the combination of all the spatial transformations of its ancestors together with the spatial transformation of the segment relative to its parent, (in terms of the RTMs of the segments, the overall transformation of a segment is a concatenation of the Relative Transformation Matrices all its ancestors together with its own RTM to give a cumulative transformation matrix herein referred to as the Concatenation Transformation Matrix or CTM);

(b) depth priority and clipping restrictions to which its parent is subject, this being of particular relevance to any child related to its parent by an above or below attachment relationship since it determines clipping and overwriting of the child beyond the boundary of its parent.

The latter inheritance gives rise to the concept that each child segment has a "background" segment which the child can overwrite but which also clips the child segment to lie within the boundary of the background segment. Where a child segment is associated with its parent by a containment relationship, then the parent also constitutes the background segment for the child. However, where the child is associated with its parent by an above or below attachment relationship, then the background segment for the child is not its parent but the first ancestor segment reached through a containment relationship when ascending the segment tree from the child segment concerned; in fact, this latter identification of a child's background segment is generally true, since where the child is related to its parent by a containment relationship, then the first ancestor segment reached from the child across a containment relationship will, of course, be the child's parent.

Figure 4:
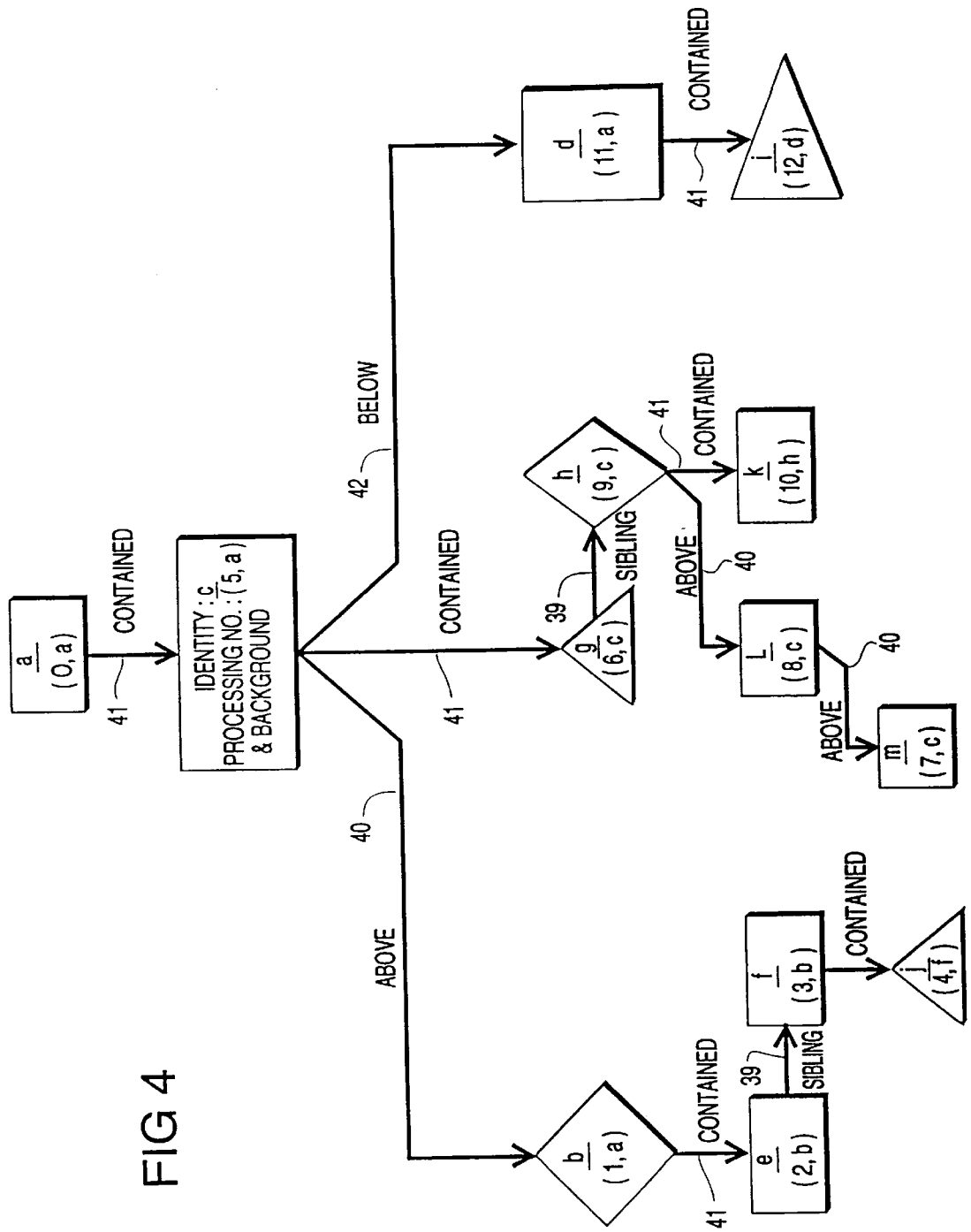
FIG. 4 shows one example of a segment tree formed by the renderer of FIG. 1.
Figure 5:
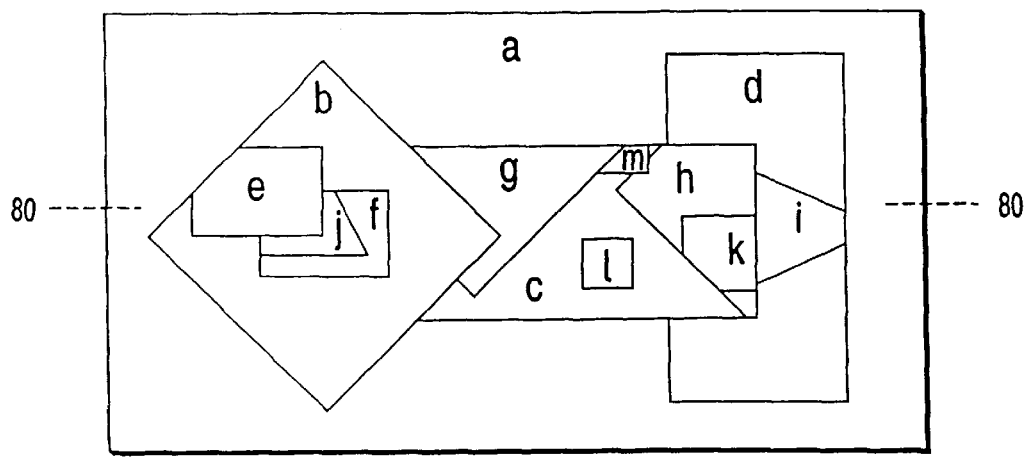
FIG. 5 shows the two dimensional image corresponding to the example segment tree of FIG. 4.

FIG. 4 and 5 show an example of a segment tree and the corresponding output image. In the segment tree of FIG. 4, the segments have been presented by their outlines and have been signed identification letters "a" to "m", these identifying letters being shown underlined within the segment boundaries. Also within each segment boundary is a (number, letter) pair shown in brackets; the letter of this pair identifies the background segment of the segment concerned whilst the number in the (number, letter) pair is a processing order number the purpose of which will be described below.

Segment "a" of the FIG. 4 segment tree is the root segment of the tree and, as such, is of particular significance. The scaling factors contained in the Relative Transformation Matrix of the root segment effectively define the scaling between the internal point-unit dimensions used by the renderer 11 and the dimensions of the output image displayed by the graphics output device 12 (frequently expressed in terms of pixels). In addition, the size of the root segment as defined by its boundary will generally be set to completely occupy the potential output image area made available by the output device 12 (after appropriate scaling as defined in the root's RTM). Generally, all other segments of the segment tree will be directly or indirectly associated with the root segment through a containment relationship 41 so that they will be clipped to lie within the boundary of the root segment. The only segments that are normally attached to the root segment by an above-attachment relationship are segments which are subject to rapid movement across the output image (for example, cursors in inter-active applications). Since the root segment generally completely occupies the output image, the below-attachment relationship is not used directly from the root segment.

FIG. 5 shows the root segment "a" as a rectangle bounding the limits of the output image with all other segments contained within the root segment.

Segment "c" is in fact the only segment in a direct containment relationship with the root segment. As can be seen, the segment "c" has three groups of children, namely an above-group that can appear above segment "c" (segments b,e,f,j), a contained group of segments that are clipped to the boundary of, but can overwrite, segment "c" (segments g,h,l,m,k) and a group of below segments that appear below segment "c" (segments d and i). Movement of segment "c" within the root segment "a" (by modification of the RTM of segment "c") results in all its child segments being similarly moved.

The construction of the output image of FIG. 5 from the segment tree of FIG. 4 should be apparent having regard to the foregoing description concerning the nature of the possible relationships between segments. Accordingly, a detailed description of FIG. 4 and 5 will not be given herein. However, a number of significant features are noted below.

The relative depth priorities of siblings is illustrated in FIGS. 4 and 5 by the segments "e" and "f". As can be seen, the segment "f" is a sibling of segment "e" but has a lower depth priority since it appears further down the sibling chain for contained child segments of parent segment "b". Accordingly, where segments "e" and "f" overlap, segment "e" is displayed in the output image. Segment "e" also overlaps the contained child of segment "f", this child being segment "j" (segment "e" would also overlap any above or below children of segment "f").

Segment "l" shows a segment related to its parent by an above-attachment relationship and illustrates the fact that such a segment, although taking priority over its parent should they overlap, does not in fact have to overlap its parent; whether or not an overlap occurs depends on the Relative Transformation Matrix of the child segment "l".

Segment "m" is a segment which is in an above-attachment relationship to segment "l" which as already noted is also in an above-attachment relationship to segment "h". Both these segments are written on segment "c" which constitutes the background segment for segment "l" and "m". As can be seen in respect of segment "m", a segment is clipped by its background segment even when the latter is not in a direct containment relationship.

Returning now to consideration of FIG. 1, the segment organizer 13 will generally take the form of appropriate program code running on a general purpose processor and responsive to create, modify and remove commands from the graphical application to construct a segment tree 20. More particularly, the segment organizer 13 may be implemented in an object-oriented idiom with class objects being provided to create segment, boundary, fill and transform instance objects as required. In this case, where, for example, the graphical application 10 wishes to create a new segment and add it to an existing tree structure, it does so by first messaging the class objects for transform, fill and boundary in order to create appropriate instances of transform, fill and boundary (assuming that appropriate instances do not already exist). In messaging the class objects to create the appropriate transform, fill and boundary instances, the application 10 will provide the necessary data. Next, the application 10 messages the segment class object requesting it to create a new segment instance utilizing the newly created boundary, fill and transform instances and having associations with other segments as specified by the application 10. In creating a new segment, it may, for example, be necessary to specify the segment as having a sibling priority higher than existing siblings. This will, of course, require pointer adjustments in the existing parent and sibling segments. Such adjustment will be handled by the segment instant objects themselves by appropriate messaging between the objects. Implementational details of such an object-oriented version of the segment organizer 13 will be apparent to persons skilled in the art and will therefore not be described further herein.

It may be noted that at the time the segment tee 20 is being constructed by the organizer 13 in response to commands on the graphical application 10, certain data items may be calculated to facilitate subsequent operation of the converter 14. In particular the Concatenation Transformation Matrix and background segment of each segment may be determined and cached for use by the converter 14. However, in the present embodiment these items are determined by the converter 14 itself.

Conversion to Span Table

The converter 14 effects a conversion process by which the segments of the segment tree 20 are converted into a set of image lines each represented by a span list containing one or more spans, the span lists being stored in the span table 60. In this conversion process, segments are correctly positioned in the final image, any overlap conflicts are resolved, and the segments are scaled from internal, point-unit co-ordinates to device co-ordinates. The device coordinates are generally specified in terms of pixels in an X,Y co-ordinate frame of reference. The image lines represented by the span lists extend in the Y co-ordinate direction of the device frame of reference (this is because the buffer 17 will generally be organized such that pixels on the same image line are adjacent in the buffer thereby increasing efficiency of access); it will be appreciated that in appropriate circumstances, the span lists could be arranged to extend in the X co-ordinate direction.

Figure 6:
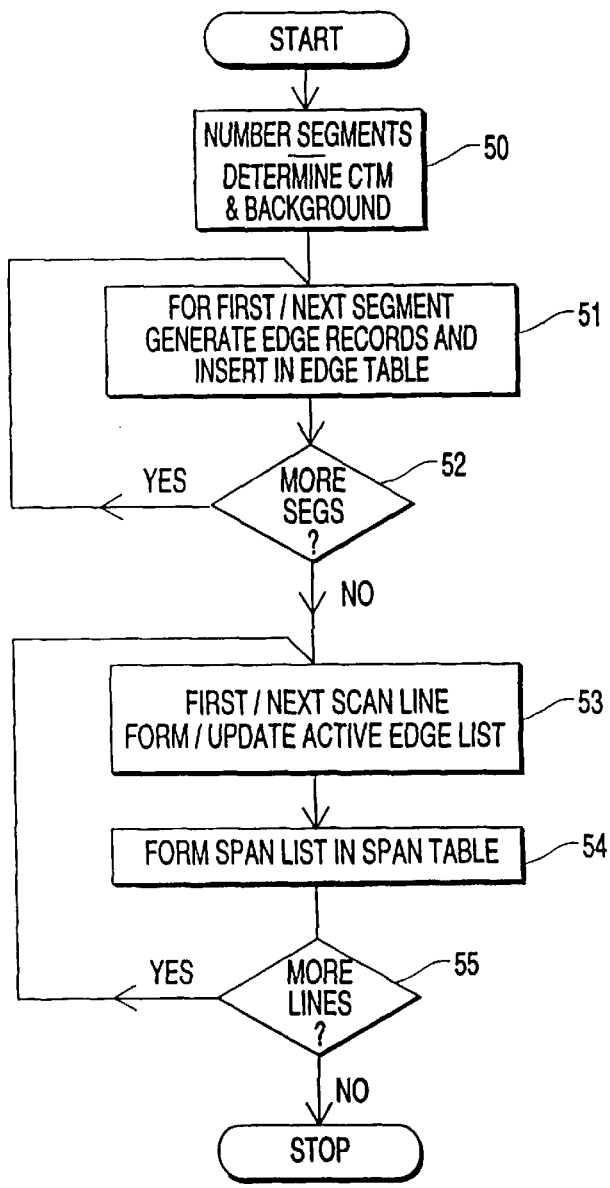
FIG. 6 is a flow chart illustrating the general progression of the conversion process effected by the FIG. 1 renderer in forming the scan table from the segment tree.

The general progression of the conversion process is illustrated in FIG. 6. The first step of the conversion process is for the segments to be numbered in the order that they are to be processed (step 50). Thereafter, the CTM and background segment are determined (in fact, this determination can conveniently be done during segment numbering and so has been shown as part of step 50). Next, an edge table is formed containing edge records on all the defining edges of all the segments (step 51 and 52). Finally, the span table is built up a line at a time by examining the edge records of the edges that intersect with the current image line of interest (steps 53–55).

Considering first the segment processing order number (step 50), the general purpose here is to ensure that segments are processed in their depth priority order so that overlap conflicts are simply resolved by not allowing subsequently processed segments to overwrite previously processed ones. However, because contained children and their descendants are clipped to the boundary of their containing ancestors, it is necessary for a background segment to be processed before its contained children (and their descendants) even though the latter overwrite the former, since otherwise the clipping boundary would not be known in image coordinate terms at the time the contained children were being processed. This requirement leads to the basic writing rule that later processed segments cannot overwrite earlier processed ones being modified by the proviso that a segment may overwrite its background segment.

In numbering the segments the tree is traversed from the root segment. For each segment the following rule is then applied regarding the precedence of numbering of associated segments:

above children (and all their descendants) of the segment under consideration are numbered first;

thereafter the segment under consideration is numbered;

next, the contained segments (and their descendants) of the segment under consideration are numbered;

finally, the below segments (and their descendants) of the segment under consideration are numbered.

With regard to siblings, these are handled staring at the head of the list so that the sibling segment at the head of the list and all of its descendants will be numbered before the second sibling (and all its descendants) are numbered and so on for other siblings in the same sibling list. The traversal numbering algorithm may be more formally represented by the following pseudo code:

PROCNUM Recursive routine for allocating processing order number.

| "This_Seg" | = current parent segment | - local |
| "S" | = child of interest | - local |
| "Number" | = processing order number | - global |

1. Starting with S set to first above child of This_Seg, repeat the following until no more above children of This_Seg, with S being set to the next above child before each repeat:
   Do routine PROCNUM for segment S as the current parent segment.
2. Increment Number.
3. Allocate Number as the processing order number of This_Seg.
4. Starting with S set to first contained child of This_Seg, repeat the following until no more contained children of This_Seg, with S being set to the next contained child before each repeat:
   Do routine PROCNUM for segment S as the current parent segment.
5. Starting with S set to first below child of This-Seg, repeat the following until no more below children of This_Seg, with S being set to the next below child before each repeat:
   Do routine PROCNUM for segment S as the current parent segment.

Using the allotted processing order number, the output image can be drawn up from the segment tree according to the above-described writing rule that a later processed segment cannot overwrite an earlier processed one except where the earlier segment is the background segment of the later processed segment.

The foregoing writing rule for converting a segment tree to an image applies regardless of the process details involved in this conversion. In other words, it applies not only for the processing effected by the converter 14 but also for physically drawing up an image by hand from a segment tree. This will be readily appreciated if the reader reproduces FIG. 5 working from the segment tree of FIG. 4 utilizing the processing order numbering that has already been annotated to the segments (this numbering having been determined in accordance with the above numbering algorithm).

After the segments have been numbered (or, as already indicated, concurrently with this numbering), the CTM and background of each segment are determined. Each determination can be readily achieved using a stack (a Last In First Out or LIFO data structure).

Thus, with regard to CTM determination, the RTM of the root segment (which is also its CTM) is first put in a CTM stack and the segment tree is then traversed. Each time a segment is first encountered by being reached by descending down a parent-child relationship or across a sibling relationship, its CTM is determined by combining its RTM with the CTM on top of the CTM stack. The newly-determined CTM is then cached with the segment data, and, in addition, placed on top of the stack. Whenever a segment is exited by ascending a parent-child relationship or by crossing a sibling relationship, then its CTM is removed from the top of the CTM stack.

Background-segment determination is effected in a similar manner with a background stack being initialized to empty before traversal of the segment tree is begun. Each time a parent-child containment relationship is descended, the identity of the parent is entered into the background stack whilst each time a containment relationship is ascended, the top stack entry is removed. The top entry in the background stack identifies the background segment for the segment currently reached during traversal of the tree; the identity of a segment's background is cached with the segment data.

After the segments have been numbered and their CTMs and backgrounds determined, the edge table 61 is created and filled (steps 51, and 52). The edge table is a data structure that contains an entry for each Y-coordinate line of the output image. The entry for each line is a list of all segment edges that, in device coordinate terms, have their starting Y co-ordinate on that line, this list being formed by a linked list of edge records 63 with the first edge record in the list being pointed to by a pointer held in the edge table data structure 61. Where there are no edges having a starting Y coordinate corresponding to a particular Y-coordinate line, the corresponding entry in the edge table is set to null.

Each edge record 63 contains data describing the corresponding segment edge in device co-ordinate terms together with the identity of the segment from which the edge originates and preferably the processing order number and background of that segment (though these latter items can always be obtained when required by referring to the segment itself).

The edge table is populated by processing each segment in turn according to the processing order number. In fact, where the whole output image is to be rendered, the order in which the segments are processed to form the edge table does not matter. To process a segment, each edge of the or each outline making up the segment boundary is transformed into its output image form by application of the CTM of the segment and data characterizing the resultant edge is stored in a corresponding edge record 63. This record is then inserted into the edge table 61 where appropriate.

Figure 7:
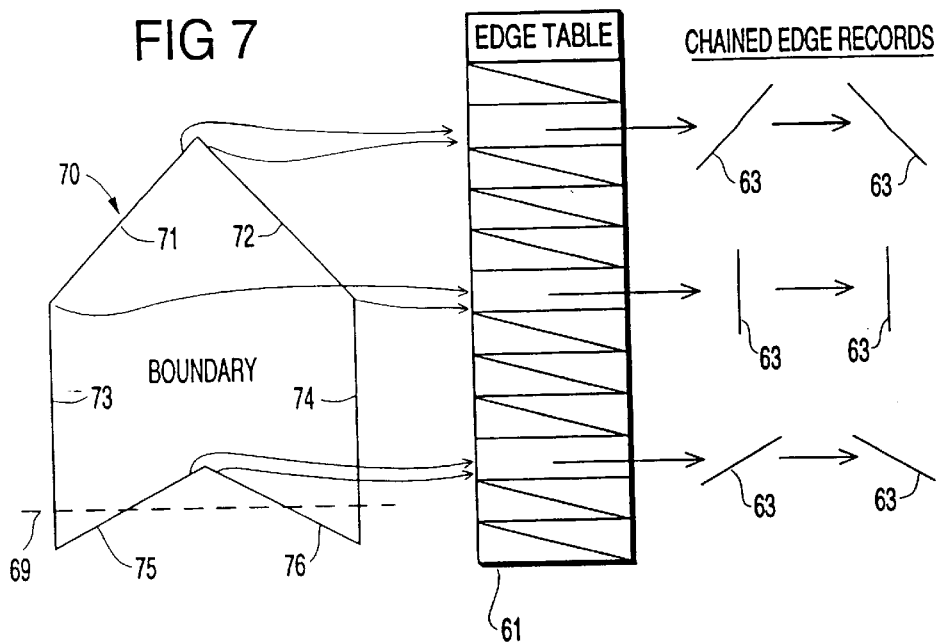
FIG. 7 is a diagram illustrating a step of the FIG. 6 conversion process in which an edge table is formed containing edge records for all the graphic segments.

FIG. 7 illustrates the processing of one segment to enter its edges into the edge table 61. As can be seen, the boundary 70 of the segment is composed of six edges 71 to 76. Edges 71 and 72 have the same starting Y coordinate and are accordingly entered as edge records 63 into the same edge list of the edge table 61. Similarly edges 73 and 74 have the same starting Y coordinates causing their edge records to be entered in the same edge list. Again, edges 75 and 76 also have the same starting Y coordinate and have their edge records 63 entered in the same edge list of the edge table 61.

Once all the edges have been entered into the edge table 61, the conversion process moves onto its next phase in which for each scan line (y-coordinate line of the output image) an active edge list 62 is formed listing all the edges intercepting the scan line (step 53), the active edge list is then used to form a corresponding span list in the span table 60 (step 54). The active edge list 62 is formed for the first scan line by entering into the active edge list all edge records 63 starting at the first line. For subsequent scan lines, the active edge list 62 is formed by updating the active edge list for the preceding scan line. This updating process involves both adding in edge records for edges that start at the current scan line, and updating the edge records already included in the active edge list. This updating involves updating the current X and Y coordinate values for the edge by changing the X coordinate according to the gradient of the edge and incrementing the Y value. In the event that this updating indicates that the edge no longer intercepts the scan line, then the edge record 63 is removed from the active edge list 62.

Figure 8:
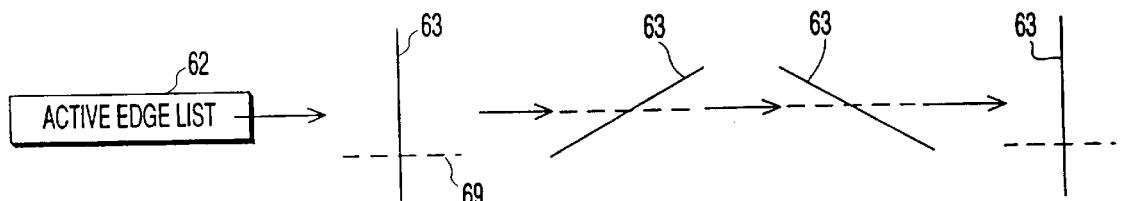
FIG. 8 is a diagram illustrating the nature of an active edge list formed during the course of the FIG. 6 conversion process.
Figure 9:
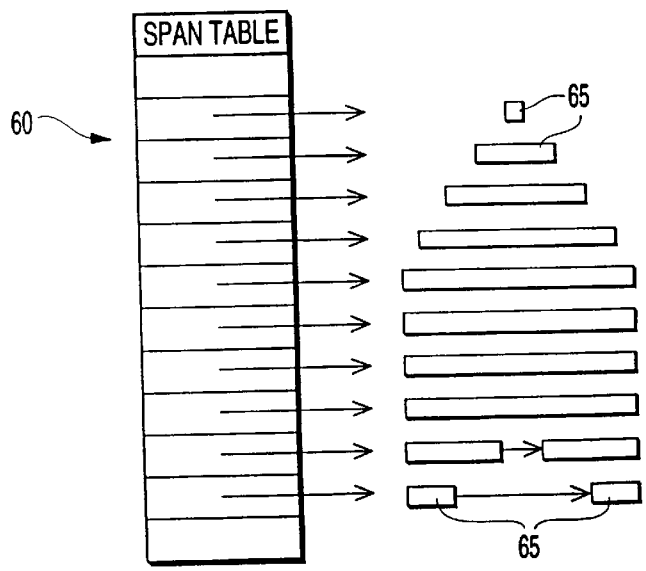
FIG. 9 is a diagram illustrating the nature of the span table produced by the FIG. 6 conversion process.

FIG. 8 shows the edge records 63 constituting the active edge list 62 for the scan line 69 shown dashed in FIG. 7. The interception of the current scan line with the edges represented by the edge records are shown in FIG. 8.

After the active edge list for a scan line has been formed, the constituent edge records are sorted according to their associated segment processing order number, and on the current X interception point of the scan line and the edge.

Figure 10:
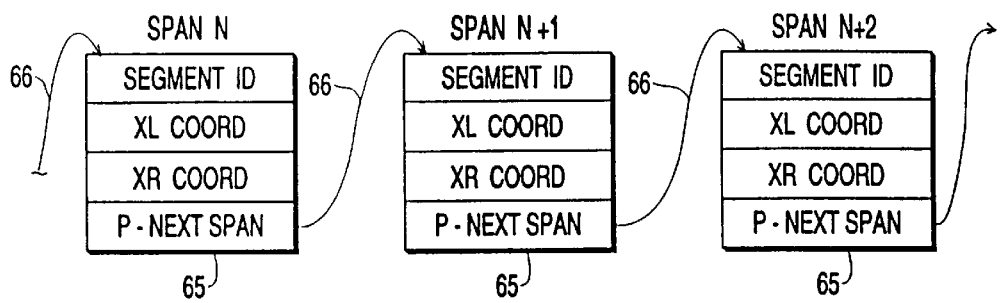
FIG. 10 is a diagram illustrating three inter-linked span data structures.

Using the sorted active edge list 62, the span table entry corresponding to the current scan line is created. This span table entry comprises a span list holding one or more spans 65 as a linked list. A span defines an uninterrupted section of an output-image scan line associated with a particular segment. FIG. 10 illustrates a portion of a scan list comprising three spans 65 identified as spans N, (N+1) and (N+2). Each span has four fields one of which identifies the relevant segment whilst two locate the span in terms of its left and right X-coordinates (XL and XR respectively); the Y coordinate field is not essential because the span table data structure implies the Y-coordinate for the spans of each constituent span list by the position of a span list in the span table. The remaining field of the span data structure is a pointer, namely a pointer 66 (P-NextSpan) that points to the next span (if any) in the current span list.

To form the span list, the active edge list is processed by taking successive pairs of edge records in the list and using each pair to form a corresponding span with its two delimiting X-coordinate values set to the current X values of the edge records concerned, the Y-coordinate value set to that of the current scan line, and its segment identity set to that of the two edge records concerned (these records will have the same segment identity because the active edge list has been sorted according to processing order number and edges to a says an even number of edges to a segment when considered at any Y-coordinate value).

Once a span has been formed, an attempt is then made to insert it into the span list for the current scan line. However, this insertion is subject to the above-mentioned rule for writing segments in the final image when processed according to their processing order number—namely that a segment (or, in this case, a span of a segment) can only be written if it does not overwrite another segment (or segment span), except where the segment to be overwritten is the background segment for the current segment. The identity of the segment constituting the background that can be overwritten by the current span is obtainable either from the edge records delimiting the span or by reference to the segment from which the span is derived.

The insertion process involves adjusting the delimiting X-coordinate values of the span being merged, and of any partially overwritten spans, as appropriate (including splitting affected spans into two or more spans where required), and setting the P-Nextspan pointers of affected spans accordingly.

Figure 11:
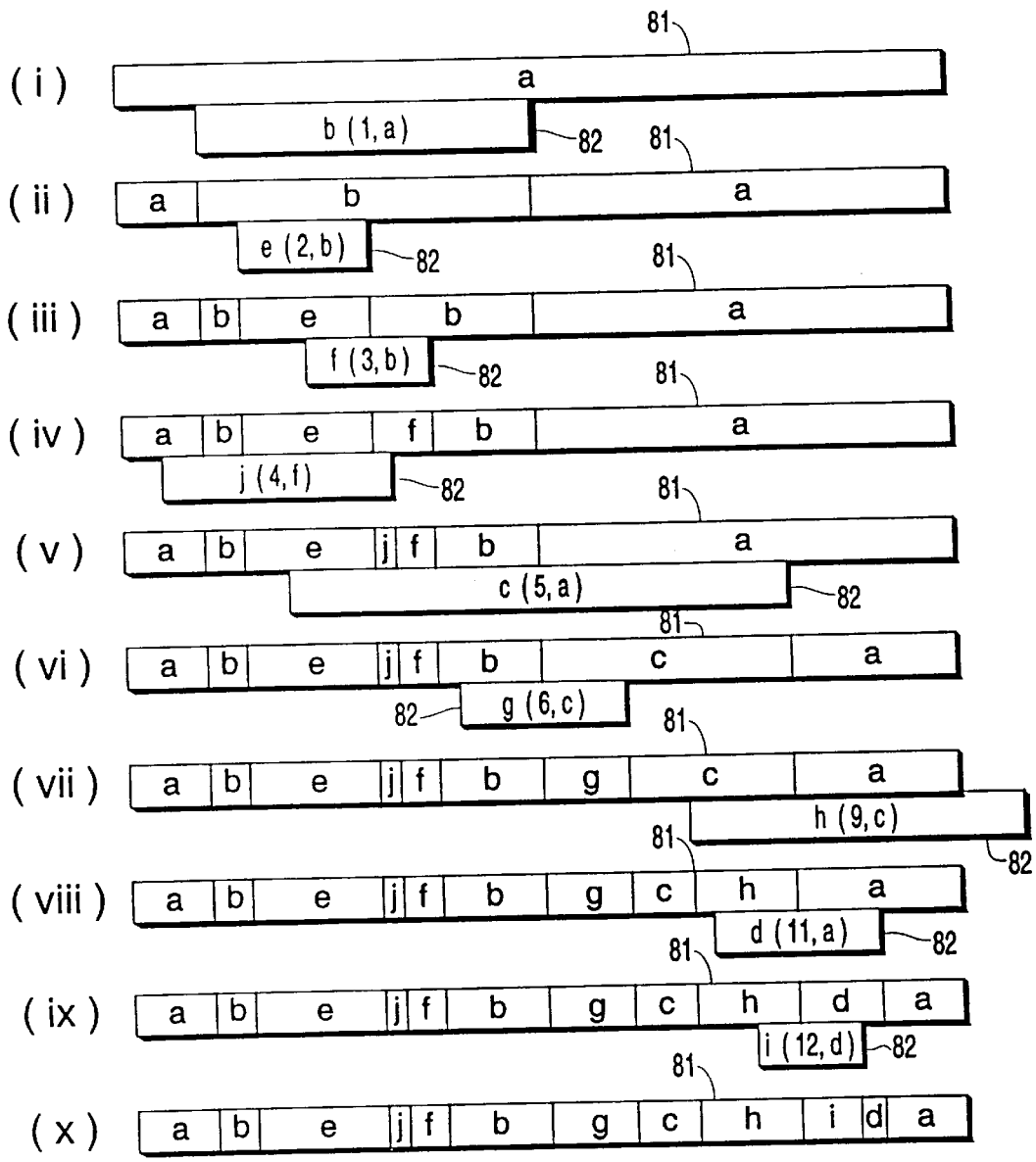
FIG. 11 is a diagram illustrating the build up of one span list of the span table for the example segment tree and image of FIGS. 4 and 5.

FIG. 11 is an example showing in ten stages the construction of a span list 81 for the scan line taken on line 80—80 in FIG 5. For each stage (i) to (x) illustrated in FIG. 11, both the current contents of the span list 81 and the span 82 to be merged into the span list, are shown, the span 82 being shown below the existing span list 81.

Within each span 82 to be merged into the span list, not only has the identity of the corresponding segment been shown, but also the (processing number, background segment) pair in order to facilitate an appreciation both of the order in which segment spans are processed and whether overwriting of the span into the existing span list will be successful.

In stage (i) the span list is shown as already holding a span corresponding to the root segment "a". The span 82 to be merged is a span from segment "b", this being the next segment to be processed according to the processing order number of the segments that intersect the scan line 80—80. The background segment for segment "b" is the root segment "a"; as a result, the span 82 for segment "b" can be fully merged into the span list. The resultant span list 81 is shown in stage (ii) of FIG. 10 and, as can be seen, the span list now comprises three spans linked together since the span originally corresponding to the root segment "a" has been split into two spans by the segment "b" span.

In stage (ii), a span 82 corresponding to segment "e" is merged into the span list 81. Since the background for segment "e" is segment "b" and since the span 82 lies wholly within the bounds of the segment "e" span in the span list 81, the whole of the segment "e" span 82 is successfully merged into the span list to produce a new span list 81 shown in stage (iii).

In stage (iii), a span 82 from segment "f" is to be merged into the span list 81, the background segment for segment "f" being segment "b". Since the segment "f" span 82 overlaps spans corresponding to segments "e" and "b" in the span list 81, only part of the span 82 will be merged into the span list 82, this part being the part overlapping the background segment "b" of segment "f". The resultant partial merge of segment "f" span 82 into the span list is shown by the new span list 81 in stage (iv).

The merging of the spans 82 into the span list 81 effected in stages (iv) to (x) proceeds in substantially the same manner as for stages (i) to (iii) and will therefore not be described in detail.

At the end of the conversion process, the segment tree 20 has been converted into a span table representation of the image in which all segments have been mapped into the final output image in their correct location, orientation and size and all overlap conflicts have been resolved. The span table 60 provides a compressed representation of the final output image in device coordinate terms.

As with the segment organizer 13, the converter 15 is preferably implemented in code running on a general purpose processor, this implementation being, for example, in an object-oriented idiom with objects corresponding to the edge table, the edge list, the edge records, the active edge list, the span table, the span lists and the spans.

Output Process

As already indicated, the span output function 15 of FIG. 1 has a single operational primitive Drawspan that commands the output device 12 to draw a line of given colour at a given Y coordinate position and between two X coordinate positions. The output process involves calling Drawspan for each of the spans in the final span table 60. Because the spans of the span table do not overlap, and are each fully defined in their own right, the order in which the spans are output to the device 12 using Drawspan is not critical. For maximum transfer efficiency, spans of the same colour can be output together so that it becomes only necessary to specify colour when this colour is to be changed (it will, of course, be appreciated that this can only be done with certain types of output device 12 where random writing of the image is possible).

The colour associated with each span in the span table is obtained by referring to the fill of the corresponding segment. Where this fill is a polychromatic bit map, then the Drawspan must be called for each mono-chromatic component sub-span.

Upon initialization of the system, the output process may initialize a colour look-up table in cooperation with the output device. At the same time, parameters such as extra-image background colour and image size may be specified. As already indicated, image size is reflected in the size of the root segment and of the scaling factors in the root segment's RTM.

The output device 12 will generally construct one or more scan lines in the buffer 17 before the scan lines are output to the real world either in the form of a display on a visual display unit or a hard copy print out. Where the buffer 17 does not hold a full image bit map, then the order in which the spans are output using Drawspan becomes important since the output device will require certain scan lines to be output before others.

User Input

With regard to user input such as is required in interactive computer graphics applications where the displayed image is changed in response to user input, the above-described graphics output system can be used with any suitable means for feeding back user input to the application 10, it generally being the job of the application 10 to determine what actions are required (which may lead to the segment tree being modified causing a change in image). An exception to this is where a pointing device, such as a mouse, is used as an input device and is operative to control an image cursor; as will be more fully described below, in this case, the input received from the pointing device is used directly to control movement of a cursor segment rather than placing the burden of this operation on the application 10.

Updating the Output Image

In the foregoing, the FIG. 1 embodiment has been described in terms of a complete segment tree being constructed by the application 10 and then being output by the renderer 11 to the output device 12. It will be appreciated that the segment tree rather than having to be recreated each time there is a change in the image to be represented, can be modified as required by use of the create, modify and delete commands by the application 10. Once modification of the segment tree is complete, it can be converted into a new span table and thus into a new output image by the renderer 11.

With a view to minimizing changes to the segment tree 20, each segment data structure 21 includes a visibility field 33 that is used to flag a segment as one not to be displayed in the current image. Where a segment is so flagged, not only is that segment not displayed but none of its descendants are displayed. This is achieved by arranging for the process of numbering the segments carried out in step 50 of the conversion process (see FIG. 6) to ignore any segment in which the visibility flag has been set and to pass on either to any sibling segment or back to the parent segment concerned. The primary use of the visibility feature is in applications where a segment may only be temporarily obscured in the image and may need to be restored rapidly, such restoration simply requiring the resetting of the visibility flag.

The actual process of converting a new or modified segment tree into an output image may be carried out from the beginning each time. However, where only a part of the segment tree has changed, it is generally more efficient to reconvert only the affected parts of the segment tree. A number of measures can be taken to effect partial updating efficiently, each measure being appropriate to a particular set of circumstances. These measures relate to:

(a) cursor movement;

(b) fill-only changes to a segment;

(c) addition/deletion of a segment by bounding the update to the outlines of the segment and its above and below children;

(d) changes to a segment that only interacts with its background segment in the output image (a Background-Only Interaction segment).

Each of the above measures will be individually described below after which a description will be given as to how these measures can be coherently integrated with each other.

(a) Cursor Movement—As already noted above, display cursors and other fast moving sprites (generally covered by the term "cursors" herein), can conveniently take the form of segments in an above-attachment relationship to the root segment of the segment tree 20. Such a cursor (or cursors) and any descendants are preferably treated as a sub-tree separate from the main sub-tree that is associated with the root segment through a containment relationship. The cursor sub-tree is then separately numbered and rendered by the converter 14 to create a separate cursor span table 60C (see FIG. 1) additional to the main output image span table 60. These two span tables are finally combined by the span output function 15 with the cursor span table 60C taking precedence over the main image span table 60. This arrangement has the advantage that the main span table does not need to be recreated each time a cursor (and its descendants) is moved but simply acts as a background for the cursor; re-creation of the cursor span table is a relatively simple matter as this table is limited to the boundary of the cursor itself (together with any descendant segments).

Movement of a cursor by modifying its RTM may be effected by the application as a consequence of some application processing decision or in response to user input via a pointing device. However, because cursor movement in response to user input via a pointing device is by far the most common form of cursor manipulation, special measures are preferably taken to maximize the efficiency of such cursor movement. More particularly, the cursor span table has associated X and Y offsets that specify, in image coordinate terms, X and Y offsets by which the spans in the cursor span table must be shifted by the span output process before being combined with the main span table. It then becomes a relatively simple matter to update the cursor's position in response to user input through a pointing device since all that is now required is for the new absolute X and Y image coordinate values pointed to by the device, to be stored and used as the aforesaid X and Y offsets. For consistency of cursor movement as effected by the application and directly from the pointing device, for any cursor displacement that the application wishes to effect the Tx and Ty translations in the cursor segments CTM are also converted by the convertor 14 into X and Y offset values for the cursor span table and are not used to position the cursor spans within the cursor span table itself.

Where several cursors exist concurrently as siblings in an above-sibling chain associated with the root segment, each cursor (with its descendants) could be treated as a separate sub-tree having its own associated span table, in which case the span output function would be operative to combine each such span table in priority order with the main span table 60.

(b) Fill-Only Segment Changes—In cases where the application modifies a segment 21 only by changing its fill, it is not, of course, necessary for the span table to be regenerated since the spans remain unaltered. All that is required is that the spans associated with the modified segment are re-output to the output device 12 using the Drawspan primitive; as already described during this process, the fill of the modified segment is appropriately referenced by the output process and each span of the modified segment is accordingly passed to the output device with the new fill.

(c) Update Bounded by Segment Outlines—Most updates involve the addition or deletion of a segment 21 from the segment tree 20. In this respect, spatial transformation of a segment by translation, rotation or re-sizing, can be considered as deleting the segment in its unmodified form and adding a segment corresponding to the modified form of the old segment. In a similar manner, changing the boundary shape of a segment can be viewed as deleting the unmodified segment and adding a new segment corresponding to the new boundary shape. Generally, therefore, the problem of re-rendering the span table 60 following modification to the segment tree 20 can be split into how to handle deletion and addition of a segment 21.

Considering first how to add a new segment 21 to the span table 60, without knowledge of the existing image structure, it is necessary to assume that the new segment may be overwritten by any higher priority segment or may be clipped by its background segment when appearing in the final image (in this case, "higher priority" strictly refers to depth priority). As a result, it is necessary to re-render all the higher priority segments and the new segments background at the same time as rendering the new segment. Unless unbounded, this updating could affect virtually the whole of the span table 60 and the corresponding output image. Accordingly, updating of the span table is restricted to a region corresponding to the new segment. This is achieved in the following manner. Upon a new segment being added to the segment tree 20, the edges defining the outer boundary of the newly added segment are added to an update outline list; these edges serve to define the update area boundary that delimits the update area. Next, the higher priority segments in the tree, the new segment itself, and its background segment are all marked as segments requiring re-rendering. Thereafter, a new edge table 61 is formed including the contents of the update outline list and all edges from the marked segments of the segment tree; the edges included from the update outline list i.e those that define the update area boundary, are given a processing order number lower than any other segment so that they are processed first. Thus, in the active edge list 62 formed for each line in turn from the new edge table 61, spans corresponding to the update area will appear first; spans corresponding to the new segment also appear in the active edge list in the normal processing order for the new segment (it should be noted that the segment tree is renumbered after modification, prior to any re-rendering of its segments).

The spans delimiting the update area are thus entered into each line of the span table in which they occur before any other spans. These update-area spans are marked such that they can be overwritten by spans from any other segment and thus they effectively act as a root region. The update-area spans are forced into the span table in the sense that they are written into the span table in appropriate positions without a consideration being given to the identity of the existing spans thereby overwritten. The other spans held in each active edge list 62 are, however, subject to the normal rules of merging spans into the span table. Due to the fact that outside of the update area the image is unchanged, no spans will be merged from the active edge list into the span table outside of the update area (a span associated with a segment cannot overwrite itself). In due course a portion of the span table within the update area is built up into its final form by merging of spans from the various segments concerned. As each span line is complete, the spans within the update-area are output using the primitive Drawspan (to this end, the limits of the update-area in the current span line are, for example, temporarily stored).

In the foregoing manner, the span table 60 is updated in a way that limits changes to the table to the update-area delimited by the boundary of the new segment.

Deletion of a segment without knowledge of the existing segment composition can be handled in a similar manner with update of the span table being restricted to within an update-area boundary corresponding to the boundary of the deleted segment. Thus, as with the addition of a segment, the bounding edges of the deleted segment are initially placed in an update outline list after which they are transferred to a new edge table 61 and given the lowest processing order number; corresponding spans are in due course forced into the span table 60 and marked such as to be overwritten by any other segment. In this case, however, it is necessary for all the remaining segments 21 of the segment tree 20 to be re-rendered (by including their edges in the edge table) because now not only might segments of higher priority appear in the modified image but also segments of lower priority. Nevertheless, the effect of forcing spans corresponding to the update area into the span table so as to restrict the updating to the update area. As a consequence, the output processing is also similarly restricted (except in cases where it is necessary to output the image as a whole such as with hard copy devices).

Generally, of course, a segment that is being added or deleted will have associated children. In this case, the update area must be extended to cover the above and below children of the added/deleted segment so that the edges entered into the above-mentioned update outline list will be those not only of the segment concerned, but also of its above and below children (contained children will not, of course, affect the area to be updated). In addition, the edges of all children (above, below, and contained) are added to the edge table to be re-rendered with the other segments involved in the update process.

Where segments are being added and deleted at the same time (for example when a segment is being moved), then the update area can be extended to include all segments being added or deleted together with all their above and below children.

Next, consideration will be given to effecting bounded updating with the assistance of knowledge of the existing composition of the output image as provided by the span table; as described above, the span table 60 contains the identity of the segment 21 associated with each span 65.

(d) Segments with Background Only Interaction (BOI)—In the present graphics output system all image elements including characters are internally represented as graphic elements and processed in the same manner. One consequence of this is that in many cases a graphic segment that is deleted or added is merely being removed or added on its background segment—thus, for example, the background segment may represent a sheet of paper and the segment being moved or added may be a character. These cases are characterized by the fact that the segment concerned interacts only with its background segments and such segments are therefore termed background-only interaction (BOI) segments. Because of the frequency of occurrence of the addition/deletion of BOI segments, it is convenient to optimize the operation of the graphics output system accordingly. To this end, when a new segment is added to the segment tree, it is tested to ascertain whether it is a BOI segment. This testing it effected by converting the segment into its corresponding spans and referencing the span table to identity which existing segments in the output image interact (by overwriting, by being overwritten, or by clipping) with the newly added segment. If the new segment is found to be a BOI segment, then a corresponding flag 200 (see FIG. 2) of the segment data structure is set and the segment is rendered by simply overwriting its spans 65 into the span table 60. However, if the new segment is not a BOI segment, then it is rendered according to the bounded updating method already described in (c) above. Where a segment is deleted from the segment tree and this segment is one in which its BOI flag is set, the span table can be readily updated simply by re-rendering the background segment of the deleted segment into the spans of the span table corresponding to the deleted segments. If a deleted segment is not a BOI segment, then updating is effective in accordance with the bounded updating process described in (c) above.

It will be appreciated that whenever the span table is modified, the converter 14 must take care of the updating of the BOI flag of each segment affected by the update. This can be done on a line by line basis. Thus, where a segment has its BOI flag set and it is not possible to merge all of a component span into a span table or that span subsequently blocks the merging of at least part of another span into the same span line, then the BOI flag of the segment must be reset.

Figure 12:
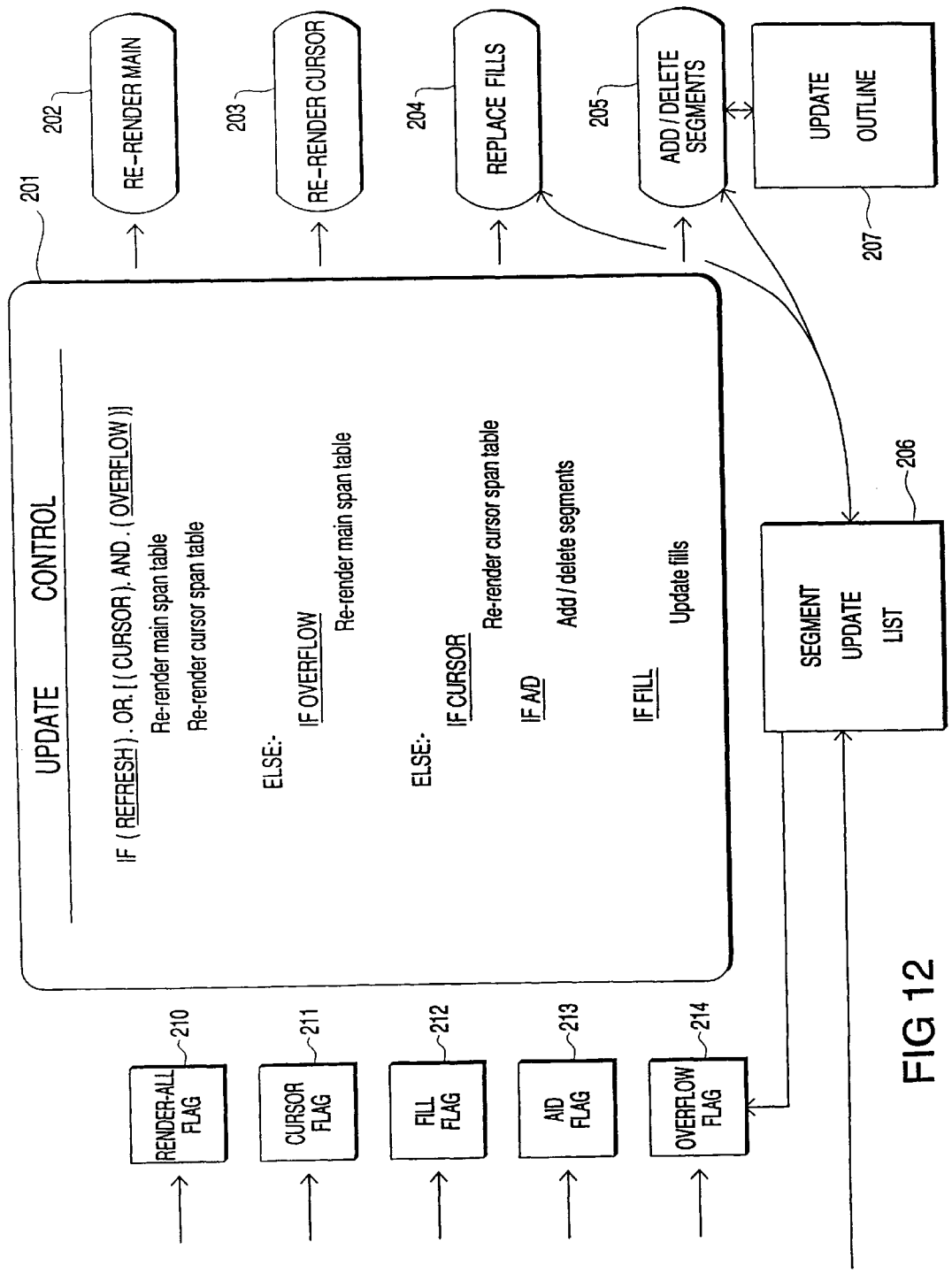
FIG. 12 is a diagram illustrating how image update control is effected in the FIG. 1 system.

FIG. 12 is a diagram illustrating how the FIG. 1 converter 14 selects which of the update processes available to it are used to effect a particular update. The four main update processes available to the converter 14 are a "re-render main" process 202 operative to re-render the whole of the span table 60 from the segment tree 20, a "re-render cursor" process 203 operative to re-render the cursor span table 60C from the appropriate segments of the segment tree 20, a "replace-fills" process 204 used for dealing with segments where the only modification made is to their fills, and an "add/delete segments" process 205 in which bounded updating of the span table 60 is effected, this updating being as described above in (d) for BOI segments where possible and otherwise as described above in (c).

The choice of update process used is made by an update control function block 201 that implements the control algorithm illustrated within that box in FIG. 12, in dependence on the state of five flags 210–214.

The first of these flags is a render-all flag 210 which is set (for example by the application 10) when it is desired that the whole image be re-rendered (that is, both the main span table 60 and the cursor span table 60C generated ab initio). The second flag is a cursor flag 211 that is set whenever the cursor is moved or there is a change solely to segments rendered in the cursor span table. The cursor flag 211 is, for example, set by an appropriate input-event handler (not shown) interfacing a pointing device with the graphics output system and also with the application 10.

The third flag is a fill flag 212 set by the segment organizer 13 whenever a segment is modified by modifying its fill only.

The fourth flag is an A/D (add/delete) flag 213 set by the segment organizer whenever a segment has been added or deleted (or both when, for example, its transform data is altered).

When the segment organizer 13 sets either the fill flag 212 or the A/D flag 213 it also enters details of the relevant segment into a segment update list 206, together with an indication of whether that segment has been added/deleted or fill modified. Of course, where a segment has been deleted from the segment tree or is modified other than by having its fill modified, then the relevant details of the old segment are temporarily stored for use during the update process. The segment update list 206 is deliberately of limited size and when this list overflows, a fifth flag, the overflow flag 214, is set to indicate this event. Overflow of the list 206 is set to occur when the number of segments to be updated is such that it is probably more efficient to regenerate the whole of the main span table 60 rather than effecting a series of bounded updates.

Referring now to the control algorithm, this is shown within block 201. Whenever the converter 14 is handed control after the segment tree has been updated by the application 10, it first tests to see if the render-all flag is set or whether both the cursor flag 211 and the overflow flag 214 are set; in either case, the converter understands that it must re-render the whole of the image by effecting both the re-render main process 202 to re-render the main span table 60 and the re-render cursor process 203 to regenerate the cursor span table 60C. If re-rendering of the whole image is not required, the control algorithm next checks to ascertain whether just the main span table needs regenerating by checking if the overflow flag 214 (but not the cursor flag 211) is set; if it is, then the re-render main process 202 is implemented. If the overflow flag is not set but the cursor flag is set then the re-render cursor process 203 is implemented.

Next, if the wholesale re-rendering of the span table 60 was not required, the A/D 213 is checked to see if any segments have been added/deleted/modified and if so, the add/delete segments process 205 is called.

The first step carried out the add/delete segments process 205 is to initiate renumbering of the segment tree (if this has not already been done by the segment organizer prior to passing control to the converter 14). Thereafter, the process 205 examines each entry in the segment update list 206 and processes it as indicated in the flow chart of FIG. 13. More particularly, each entry in the list 206 is examined to ascertain whether it relates to the addition or deletion of a segment (step 220); note that if the entry relates to a fill-only segment update, then processing passes to an examination of the next entry. If a segment is being added, it is converted into its corresponding spans (step 221) and a test is made to ascertain whether the segment is a BOI segment (step 222). If the segment being added is a BOI segment then its spans are written directly into the span table 60 and the BOI flag of the corresponding segment is set (step 223). However, if the segment being added is not a BOI segment, then its boundary outline and that of its above and below children are added to the update outline list 207; at the same time all higher priority segments, the segment itself and all its children and its background segment are all marked in the segment tree as being segments to be re-rendered (step 224).

Where the segment update list entry indicates that a segment is to be deleted (step 220), a check is made on the BOI flag of the segment (step 225). If this flag is set, then the background segment to the segment being deleted is re-rendered into the spans of the deleted segment. If, however, the BOI flag of the segment is not set, then its outline and that of its above and below children are added to the update outline list 207 and all the segments in the segment tree are marked as requiring re-rendering.

Figure 13:
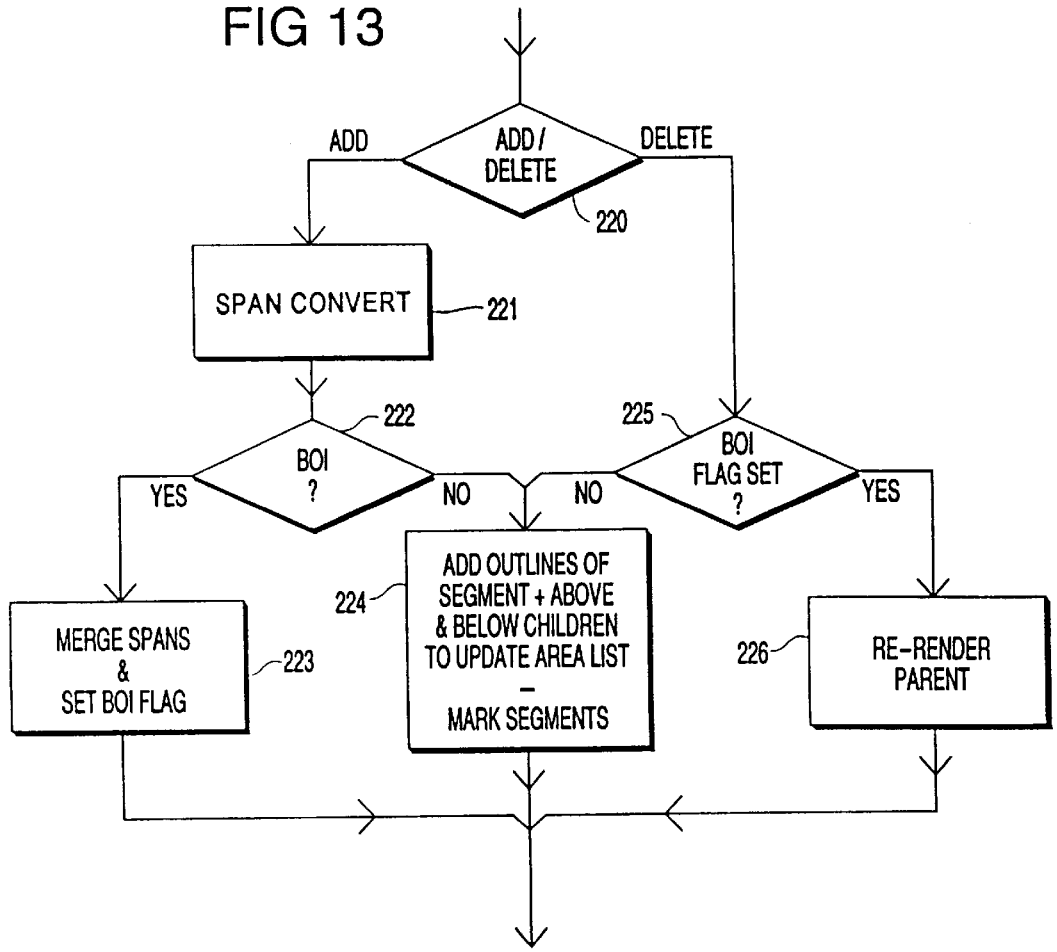
FIG. 13 is a flow chart of part of a bounded update process carried out by the FIG. 1 converter.

After every add/delete segment entry in the list 206 has been processed in accordance with FIG. 13, the update outline list 207 is checked. If this list is empty then the process 206 is complete. However, if the list contains outlines defining an update area, then the update process proceeds in the manner described above by forcing the update-area into the span table and re-rendering the marked segments into that area.

Finally, the control algorithm goes on to check whether any segments has simply had their fill modified by checking to see if the fill flag 212 has been set. If this is the case then the replace fills process 204 is called. This process does not modify the span tables but checks the update list for segments which have only had their fills modified and then proceeds to cause the span output process 15 to re-output the spans of the appropriate segments to the output device 12. In fact, before the fill of a segment is re-output, a check is made regarding whether the segment has been already processed by the add/delete process 205 since if it has, then there is no need to re-output its fill; this check can be made by referring to the lists 206 and 207 or by reference to the segments themselves if they have been appropriately marked.

It may be noted that because the output image is stored in the span tables 60, 60C, the renderer 11 can be arranged to provide an image refresh to the graphics output device. In this case, the span output process 15 re-renders the whole of the span table 60 and cursor span table 60C to the output device 12 using the Drawspan primitive. This operation does not involve regeneration of the span table either in whole or in part.

Variants

It will be appreciated that the above-described graphics output system can be subject to many variations without departing from the concept of the present invention as set out in the accompanying claims.

Thus, it is possible to effect bounded updating for non-BOI segments that makes use of a knowledge of the existing image composition. For example, where a new segment is added but this segment interacts with more than just its background, then the span table can be updated by rendering the new segment but only permitting its spans to overwrite spans in the span table associated either with the background of the new segment or with lower-priority segments clipped to the same background (the relationships between the new and existing segments, can, of course, be ascertained by reference to the segment tree 20). Where a segment is deleted, then its background segment and all lower-priority segments can be re-rendered and written into the spans of the deleted segment that exist in the span table.

In fact, if a full record is kept of the interaction of the spans at all levels (that is, not just at the top level defining the output image but also at lower levels where a span has not been successful in becoming the span appearing in the image), then deletion of a segment can be readily implemented. This is the case because deletion of that segment span from the span table can be arranged to automatically promote the next level spans so that where the spans for the deleted segment are top level spans, the spans below that top level now become the top level spans.

It will, of course, be appreciated that the general organization of the collection of segments 21 may differ from that described; for example, the above and below attachment relationships or the containment relationship need not be implemented.

I claim:

1. A graphics output system comprising:

segment storage means for storing a collection of graphic segments for display in overlapping relation in a two-dimensional output image, said graphic segments being specified by data including boundary data determining the boundary of each segment, and inter-relationship data determining the relative depth priorities of the segments in the output image and any background relationship between a background segment and a corresponding relatively higher depth priority segment, each background relationship resulting in clipping of each said relatively higher depth priority segment to the boundary of the corresponding background segment;

means for modifying said collection of graphics segments, and converter means for rendering the stored graphic segments as an image representation representative of said two-dimensional output image with all interactions between segments taken into account, the converter means being operative to store said image representation, and said converter means being responsive to modification of said collection of graphic segments, to update said stored image representation within a region that is delimited by the boundary of one or more segments associated with said modification, said converter means being operative to maintain association data indicative of a segment appearing at each position within said output image and, in response to said collection of graphic segments being modified by a new segment being added thereto, to update said image representation by determining, from said association data, whether the new segment interacts solely with a background segment thereof and, if so, to render said new segment and overwrite the existing image representation with said newly-rendered segment, wherein each said segment has an associated background-interaction indicator for indicating whether its interaction in said output image is solely with a background segment thereof, said converter means controlling this indicator in dependence on the determination it makes during the addition of a segment to said stored image representation, and said background-interaction indicator of said deleted segment being operative to facilitate the determination by said converter means of whether the deleted segment interacts solely with its background.

2. A graphics output system comprising:

segment storage means for storing a collection of graphic segments for display in overlapping relation in a two-dimensional output image, said graphic segments being specified by data including boundary data determining the boundary of each segment, and inter-relationship data determining the relative depth priorities of the segments in the output image and any background relationship between a background segment and a corresponding relatively higher depth priority segment, each background relationship resulting in clipping of each said relatively higher depth priority segment to the boundary of the corresponding background segment;

means for modifying said collection of graphics segments, and converter means for rendering the stored graphic segments as an image representation representative of said two-dimensional output image with all interactions between segments taken into account, the converter means being operative to store said image representation, and said converter means being responsive to modification of said collection of graphic segments, to update said stored image representation within a region that is delimited by the boundary of one or more segments associated with said modification, said converter means, in response to said collection of graphic segments being modified by a new segment being added thereto, being operative to update said stored image representation by rendering the following segments from the modified collection:

segments of higher depth priority than said new segment, any background segment of said new segment, and said new segment itself, and writing them to said stored image representation within said region defined by the boundary of said new segment, and wherein said converter means, in response to the modification of said collection of graphic segments by deletion of an existing segment therefrom, is operative to update said image representation by rendering all the segments from the modified collection and writing them to said image representation with overwriting of the image representation being limited to within the boundary of the deleted segment, said converter means limiting overwriting of the image representation to within the boundary of a new or deleted segment by initially marking the region of said image representation corresponding to said new or deleted segment as a root region overwritable by all segments, and thereafter writing the segments rendered from said modified collection into said image representation with each segment only overwriting said root region or a lower-priority segment.

3. A graphics output system comprising:

segment storage means for storing a collection of graphic segments for display in overlapping relation in a two-dimensional output image, said graphic segments being specified by data including boundary data determining the boundary of each segment, and inter-relationship data determining the relative depth priorities of the segments in the output image and any background relationship between a background segment and a corresponding relatively higher depth priority segment, each background relationship resulting in clipping of each said relatively higher depth priority segment to the boundary of the corresponding background segment;

means for modifying said collection of graphics segments, and converter means for rendering the stored graphic segments as an image representation representative of said two-dimensional output image with all interactions between segments taken into account, the converter means being operative to store said image representation, and said converter means being responsive to modification of said collection of graphic segments, to update said stored image representation within a region that is delimited by the boundary of one or more segments associated with said modification, said converter means, in response to said collection of graphic segments being modified by a new segment being added thereto, being operative to update said stored image representation by rendering the following segments from the modified collection:

segments of higher depth priority than said new segment, any background segment of said new segment, and said new segment itself, and writing them to said stored image representation within a region defined by the boundary of said new segment, wherein said new or deleted segment has at least one associated child segment, said at least one child segment being processed by said converter means along with its parent with the region encompassing said at least one child.

4. A graphics output system comprising:

segment storage means for storing a collection of graphic segments for display in overlapping relation in a two-dimensional output image, said graphic segments being specified by data including boundary data determining the boundary of each segment, and inter-relationship data determining the relative depth priorities of the segments in the output image and any background relationship between a background segment and a corresponding relatively higher depth priority segment, each background relationship resulting in clipping of each said relatively higher depth priority segment to the boundary of the corresponding background segment;

means for modifying said collection of graphics segments, and converter means for rendering the stored graphic segments as an image representation representative of said two-dimensional output image with all interactions between segments taken into account, the converter means being operative to store said image representation, and said converter means being responsive to modification of said collection of graphic segments, to update said stored image representation within a region that is delimited by the boundary of one or more segments associated with said modification, said collection of segments being modified by modifying an existing segment in a manner affecting the appearance of other segments in said output image, and said collection of segments is treated by said converter means as a deletion from said existing segment in its unmodified form and addition of a new segment corresponding to said existing segment in its form after modification and wherein deletion of said existing segment in its unmodified form is effected by said converter means responding to the modification of said collection of graphic segments by the deletion of an existing segment therefrom, to update said image representation by rendering all the segments from the modified collection and writing them to said image representation with overwriting of the image representation being limited to within the boundary of the deleted segment, and said existing segment is added to the output image by said converter means responding to the modification of said collection of graphic segments to update said image representation by rendering the following segments from the modified collection:

segments of higher depth priority than said new segment, any background segment of said new segment, and said new segment itself, and writing them to said image representation with overwriting of said image representation being limited to within the boundary of said new segment.

5. A graphics output system comprising:

segment storage means for storing a collection of graphic segments for display in a two-dimensional output image, said graphic segments being specified by data including boundary data determining the boundary of each segment, and inter-relationship data determining (i) the relative depth priorities of the segments in the output image on the basis that lower priority segments can be overwritten by higher priority ones in the output image in cases of overlap, and (ii) any background relationship between a background segment and a corresponding relatively higher depth priority segment, each background relationship resulting in clipping of each said relatively higher depth priority segment to the boundary of the corresponding background segment;

converter means for rendering the stored graphic segments as an image representation representative of said two-dimensional output image with all interactions between segments taken into account, the converter means being operative to store said image representation; and output means for generating, from the stored image representation, output signals for feeding to a graphics output device to enable the latter to produce said two-dimensional output image;

said graphics output system further comprising:

means for modifying said collection of graphic segments to produce a modified collection in accordance with at least one modification segment; and update means included in said converter means and responsive to modification of said collection of graphic segments, to update the stored image representation within a region that is delimited by said at least one modification segment, said update means comprising:

first means for marking the region of said stored image representation corresponding to said at least one modification segment as a root region overwritable by all segments, and second means for rendering of segments from said modified collection and for writing them into said stored image representation only in said root region, said second means referencing said stored image representation in determining the extent of said root region.

6. A graphics output system according to claim 5, wherein said update means, in response to said collection of graphic segments being modified by a new segment being added thereto, is operative to update said stored image representation by rendering the following segments from the modified collection:

segments of higher depth priority than said new segment, any background segment of said new segment, and said new segment itself, and writing them to said stored image representation within a said root region defined by the boundary of said new segment.

7. A graphics output system according to claim 6, wherein said new or deleted segment has at least one associated child segment, said at least one child segment being process by said update means along with its parent with the root region encompassing said at least one child.

8. A graphics output system according to claim 5, wherein said converter means is operative to maintain association data indicative of a segment appearing at each position within said output image; said update means, in response to said collection of graphic segments being modified by a new segment being added thereto, being operative to update said image representation by determining, from said association data, whether the new segment interacts solely with a background segment thereof and, if so, to render said new segment and overwrite the existing image representation with said newly-rendered segment.

9. A graphics output system according to claim 8, wherein each said segment has an associated background-interaction indicator for indicating whether its interaction in said output image is solely with a background segment thereof, said converter means controlling this indicator in dependence on the determination it makes during the addition of a segment to said stored image representation.

10. A graphics output system according to claim 9, wherein said converter means is operative to maintain association data indicative of a segment appearing at each position within said output image; said converter means, in response to the modification of said collection of graphic segments by deletion of an existing segment therefrom, being operative to update said stored image representation by determining whether the deleted segment interacts solely with a background segment thereof in said image and, if so, to re-render only said background segment and overwrite the existing said image representation with said re-rendered background segment where, according to said association data, said deleted segment appeared in said stored image representation, said background-interaction of said deleted segment is used to facilitate the determination by said converter means of whether the deleted segment interacts solely with its said background.

11. A graphics output system according to claim 5, wherein said update means, in response to the modification of said collection of graphic segments by deletion of an existing segment therefrom, is operative to update said stored image representation by rendering all the segments from the modified collection and writing them to said image representation with overwriting of the image representation within said root region defined by the boundary of the deleted segment.

12. A graphics output system according to claim 5, wherein said converter means is operative to maintain association data indicative of a segment appearing at each position within said output image; said converter means, in response to the modification of said collection of graphic segments by deletion of an existing segment therefrom, being operative to update said stored image representation by determining whether the deleted segment interacts solely with a background segment thereof in said image and, if so, to re-render only said background segment and overwrite the existing said image representation with said re-rendered background segment where, according to said association data, said deleted segment appeared in said stored image representation.

13. A graphics output system according to claim 5, wherein said converter means is operative to maintain association data indicative of both a top-level segment appearing at each position within said output image and any next-level segment underlying said top-level segment for each said position; said update means, in response to the modification of said collection of graphic segments by deletion of an existing segment therefrom, being operative for each occurrence of said deleted segment in said image representation as a top-level segment, to replace that occurrence by upgrading the corresponding next-level segment to a said top-level segment.

14. A graphics output system according to claim 5, wherein said collection of segments is modified by modifying an existing segment in a manner affecting the appearance of other segments in said output image, and said collection of segments is treated by said update means as a deletion from said existing segment in its unmodified form and addition of a new segment corresponding to said existing segment in its form after modification.

15. A graphics output system according to claim 5, wherein the image representation generated by said converter means takes the form of a set of spans for each of plural lines used to build up the output image, each span in said set of spans representing at least a portion of a respective segment to be displayed in said output image and including delimiting coordinate values along the corresponding image line.

\* \* \* \* \*